United States Patent
Kita et al.

(10) Patent No.: US 11,415,167 B2
(45) Date of Patent: Aug. 16, 2022

(54) SHAFT MEMBER AND MANUFACTURING METHOD OF SHAFT MEMBER

(71) Applicant: C. Uyemura & Co., Ltd., Osaka (JP)

(72) Inventors: Akihiko Kita, Aichi (JP); Seiya Ozawa, Aichi (JP); Takahiro Mori, Aichi (JP); Shoji Iguchi, Aichi (JP); Osamu Matsumoto, Aichi (JP)

(73) Assignee: C. Uyemura & Co., Ltd., Osaka (JP)

( * ) Notice: Subject to any disclaimer, the term of this patent is extended or adjusted under 35 U.S.C. 154(b) by 0 days.

(21) Appl. No.: 16/968,226

(22) PCT Filed: Dec. 27, 2018

(86) PCT No.: PCT/JP2018/048335
§ 371 (c)(1),
(2) Date: Aug. 7, 2020

(87) PCT Pub. No.: WO2019/187453
PCT Pub. Date: Oct. 3, 2019

(65) Prior Publication Data
US 2021/0032756 A1 Feb. 4, 2021

(30) Foreign Application Priority Data

Mar. 28, 2018 (JP) .............................. JP2018-062100

(51) Int. Cl.
*F16C 3/02* (2006.01)
*C23C 18/32* (2006.01)
*C25D 7/00* (2006.01)

(52) U.S. Cl.
CPC ................ *F16C 3/02* (2013.01); *C23C 18/32* (2013.01); *C25D 7/00* (2013.01); *F16C 2223/70* (2013.01)

(58) Field of Classification Search
CPC .... F16C 3/02; F16C 2223/00; F16C 2223/70; C23C 18/32; C25D 7/00
See application file for complete search history.

(56) References Cited

U.S. PATENT DOCUMENTS

| 3,077,285 A | * | 2/1963 | Budininkas | ............. C23C 16/12 |
| | | | | 220/62.17 |
| 5,385,408 A | * | 1/1995 | Tevaarwerk | ........ F16C 33/1075 |
| | | | | 384/115 |

(Continued)

FOREIGN PATENT DOCUMENTS

| CN | 200981359 Y | 11/2007 |
| JP | 54145335 A * | 11/1979 |

(Continued)

OTHER PUBLICATIONS

JP-2003254096-A, machine translation, originally published 2003, p. 1-17 (Year: 2003).*

(Continued)

*Primary Examiner* — Adam D Rogers
(74) *Attorney, Agent, or Firm* — Sughrue Mion, PLLC

(57) ABSTRACT

A shaft member of an embodiment includes: a base material having a shaft shape and made of steel; a low phosphorus plating layer that is laminated on the base material, that includes phosphorus, and in which the phosphorus content is 4.5 mass % or less; and a base plating layer that is formed as an electrolytic nickel phosphorus plating layer or a high phosphorus plating layer laminated between the base material and the low phosphorus plating layer. It is thus possible to increase the strength of the shaft member and decrease the size of the shaft member.

8 Claims, 4 Drawing Sheets

(56) References Cited

U.S. PATENT DOCUMENTS

| | | | |
|---|---|---|---|
| 6,562,151 B2 * | 5/2003 | Hirakawa | C23C 8/26 148/318 |
| 2004/0176261 A1 * | 9/2004 | Tojou | C10M 169/04 508/485 |

FOREIGN PATENT DOCUMENTS

| | | | | |
|---|---|---|---|---|
| JP | H09164284 | A | * | 6/1997 |
| JP | H10339317 | A | * | 12/1998 |
| JP | 2003254096 | A | * | 9/2003 |
| JP | 2010-270860 | A | | 12/2010 |
| JP | 2013530352 | A | * | 7/2013 |

OTHER PUBLICATIONS

International Search Report for PCT/JP2018/048335, dated Mar. 19, 2019.
"Application and Technology on Surface Treatment of Titanium and Titanium Alloys", Nov. 2010, p. 48 (4 pages total), ISBN 978-7-118-06969-3.

* cited by examiner

FIG. 4

| SAMPLE | MATERIAL | HEAT TREATMENT | PHOSPHORUS AMOUNT (mass%) | PLATING | | | | | PLATING HARDNESS | FATIGUE STRENGTH [EVALUATION] |
| --- | --- | --- | --- | --- | --- | --- | --- | --- | --- | --- |
| | | | | BAKING | BASE PLATING | PRETREATMENT | FILM THICKNESS | | | |
| FIRST EMBODIMENT | SUJ2 | FURNACE QUENCHING | 1~1.5 | NONE | ELECTROLYTIC NICKEL PLATING | IMMERSION DEGREASING | 10 μm | | Hv663 | OVER 1456 MPa [○] |
| SECOND EMBODIMENT | SUJ2 | FURNACE QUENCHING | 1~1.5 | NONE | HIGH PHOSPHORUS PLATING | ANODE ELECTROLYTIC DEGREASING | 10 μm | | Hv663 | OVER 1456 MPa [○] |
| COMPARATIVE EXAMPLE | SCM420H | CARBURIZING AND NITRIDING | 8~10 | AT 330°C FOR 1 HOUR | NONE | ANODE ELECTROLYTIC DEGREASING | 10 μm | | Hv722 | 905MPa [×] |

SHAFT MEMBER AND MANUFACTURING METHOD OF SHAFT MEMBER

CROSS REFERENCE TO RELATED APPLICATIONS

This application is a National Stage of International Application No. PCT/JP2018/048335 filed Dec. 27, 2018, claiming priority based on Japanese Patent Application No. 2018-062100 filed Mar. 28, 2018, the entire contents of which are incorporated herein by reference.

TECHNICAL FIELD

The present invention relates to a shaft member and a manufacturing method of the shaft member.

BACKGROUND ART

It is desired that mechanical parts such as a shaft member and a gear member have a hard surface and a high abrasion resistance, and that the inside have viscosity and can withstand an impact load.

As an alloy steel used for this purpose, chromium molybdenum steel such as SCM420H that is one of the alloy steels for machine structures, is known.

The above-described SCM420H is a kind of case hardening steel, and has excellent resistance to tempering, excellent mechanical properties, and toughness. Thus, SCM420H is often used as an automobile part such as a crankshaft or a flywheel.

RELATED ART DOCUMENTS

Patent Documents

Patent Document 1: Japanese Unexamined Patent Application Publication No. 2010-270860 (JP 2010-270860 A)

SUMMARY OF THE DISCLOSURE

Problem to be Solved by the Disclosure

Meanwhile, in order to use the case hardened steel as the shaft member, an improvement in wear resistance of the surface is desired. Thus, it is common to perform plating process on the surface of the case hardened steel.

Specifically, for example, after the base material SCM420H (case hardened steel) is subjected to electrolytic degreasing as a pretreatment and electroless nickel-phosphorous plating of medium phosphorus or high phosphorus, and the resultant SCM420H is subjected to baking for hydrogen removal to ensure strength. Such a configuration is taken to form the shaft member.

Here, the electroless nickel phosphorus plating is defined as low phosphorus (plating) when a phosphorus content in an electroless nickel phosphorus plating film is less than 4.5%, defined as medium phosphorus (plating) when the phosphorus content is 4.5% or more to less than 10.5%, and defined as high phosphorus (plating) when the phosphorus content is 10.5% or more.

Unfortunately, in the above-described conventional shaft member, there is a case in which a large amount of Ni3P is generated in a plating layer when baking is performed, in the electroless nickel phosphorus plating of medium phosphorus or high phosphorus. Thus, the plating layer is embrittled. That is, as in the case of using the shaft member as a pinion shaft for a differential_device, the size cannot be reduced to ensure fatigue strength in applications in which internal stress is increased due to bending load. Consequently, the size of a device using the shaft member cannot be reduced. If baking is not performed, most of the plating structure has an amorphous structure, and there is a possibility that a plating hardness is reduced and that wear resistance of the pinion shaft is deteriorated.

In contrast, although adhesion with the base material is good in the electroless nickel phosphorus plating of medium phosphorus or high phosphorus, when the electroless nickel phosphorus plating of low phosphorus is used to avoid embrittlement of the plating layer etc., there is a possibility that adhesion is decreased and the electroless nickel phosphorus plating becomes easily separated from the base material.

The present disclosure has been made in view of the above, and it is an aspect of the present disclosure to provide a shaft member and a manufacturing method of the shaft member, in which it is possible to increase the strength of the shaft member while maintaining plating adhesion to a base material and consequently decrease the size of the shaft member.

Means for Solving the Problem

A shaft member of an embodiment includes: a base material having a shaft shape and made of steel; a low phosphorus plating layer that is laminated on the base material; and a base plating layer that is formed as an electrolytic nickel phosphorus plating layer or a high phosphorus plating layer laminated between the base material and the low phosphorus plating layer.

A manufacturing method of a shaft member includes: a degreasing step of performing electroless degreasing or anodic electrolytic degreasing for a predetermined time on a base material made of steel that configures a shaft member; and a plating step of performing low phosphorus-type plating in which a phosphorus content is 4.5 mass % or less.

Effects of the Disclosure

According to the above configuration, the generation of Ni3P is suppressed and embrittlement is suppressed. Further, the occurrence of amorphous structure is also suppressed, and it is possible to improve wear resistance and increase the strength of the shaft member while maintaining adhesion to the base material. Consequently, the size the shaft member can be reduced.

BRIEF DESCRIPTION OF THE DRAWINGS

FIG. 4 is an explanatory view of the embodiment and a comparative example.

MODES FOR CARRYING OUT THE DISCLOSURE

Figure 1:
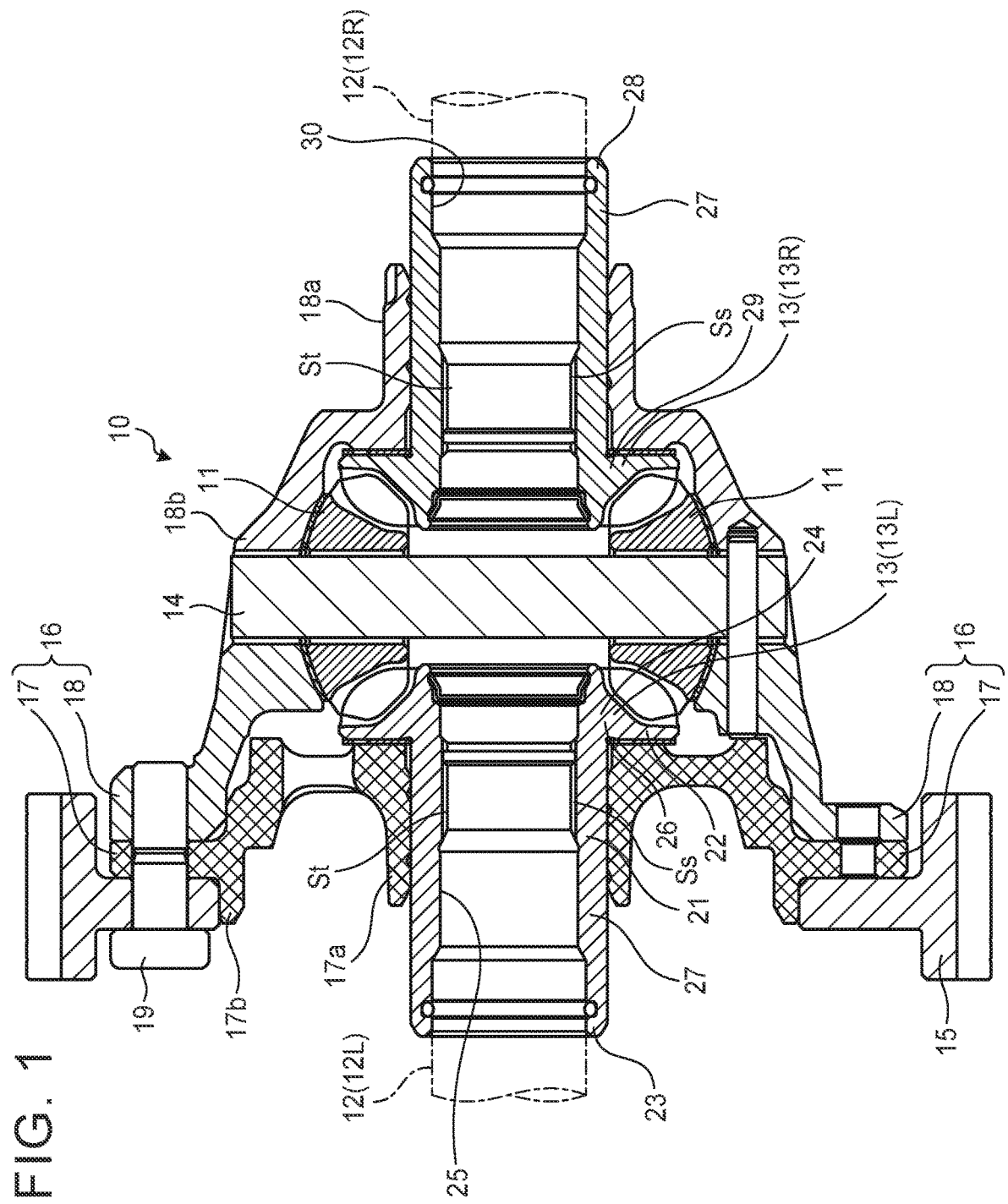
FIG. 1 is a cross-sectional view of a differential device.

Next, a shaft member and a manufacturing method of the shaft member will be described with reference to the drawings.

First, the principle of the embodiment will be described.

For cases where bending stress is repeatedly applied to the shaft member, it is desired that an internal hardness of the shaft member be increased in order to improve fatigue strength, which is the upper limit of a stress amplitude at which the shaft member is not destroyed even if bending stress is effectively repeatedly applied for an infinite number of times.

Thus, in the present embodiment, high carbon steel having a high internal hardness is used as a base material (material) of the shaft member.

In contrast, using high carbon steel for the shaft member reduces the toughness, so that the shaft member is sensitive to a notch. Thus, when a plating layer is provided to a surface of the shaft member to improve wear resistance, there is a possibility that fatigue fracture occurs, starting from a crack in the plating layer. In particular, when nickel-phosphorus plating is used as the plating layer, if $Ni_3P$ is present in the plating layer, there is a possibility that the plating layer is embrittled and cracked.

Therefore, in the present embodiment, the generation of $Ni_3P$ is suppressed by not performing baking.

If baking is not performed, the hardness of the plating layer is insufficient. Thus, a so-called low phosphorus-type plating (layer) is used. In the plating the hardness of a plating film is high even in a plating deposition state and the film has a phosphorus content of around 4 wt % or less.

Further, if baking is not performed, hydrogen may remain in the steel material, which may cause delayed fracture. In a degreasing step, immersion degreasing or anodic electrolytic degreasing is performed while avoiding cathodic electrolytic degreasing in which there is a possibility of hydrogen being mixed.

Further, the low phosphorus-type plating (layer) is inferior in terms of adhesion to the material (base material). Thus, as the base plating (layer), an electrolytic nickel plating process or an electroless nickel plating process of medium phosphorus to high phosphorus is performed.

In this case, when forming a high phosphorus electroless nickel plating layer having an amorphous structure as the base plating layer, the thickness of the high phosphorus electroless nickel plating layer is set to be smaller than the thickness of the low phosphorus electroless nickel plating layer. As a result, it is possible to obtain the shaft member in which plating adhesion to the base material is not deteriorated while embrittlement of the plating layer is suppressed and the hardness of the plating is maintained.

As a result, it is possible to suppress generation of cracks in the nickel-phosphorous plating layer and improve fatigue strength without deteriorating wear resistance and seizure resistance of the shaft member.

Hereinafter, more specific embodiments will be described.

First, a case in which the shaft member is applied to a pinion shaft for a differential device will be described. A pinon shaft for a differential device requires high fatigue strength and wear resistance.

FIG. 1 is a cross-sectional view of a differential device.

As shown in FIG. 1, the differential device 10 has a pair of (two) pinion gears 11, and a pair of (two) side gears 13 (13L, 13R) that is fixed to the drive shafts 12 (12L, 12R) and that is meshed with the pinion gears 11 at right angles.

The differential device 10 has a pinion shaft 14 serving as a shaft member that supports the pinion gears 11, and a differential case 16 (first differential case 17, second differential case 18) housing the pinion gears 11 and the side gears 13 (13L, 13R) and to which a differential ring gear 15 is coupled (fixed).

In the following description, the drive shaft 12L and the drive shaft 12R are simply referred to as the "drive shaft 12" unless it is necessary to particularly distinguish between the two. Similarly, the left side gear 13L connected to the drive shaft 12L and the right side gear 13R connected to the drive shaft 12R are simply referred to as the "side gear 13" unless the left side gear 13L and the right side gear 13R are particularly distinguished from each other.

In the above configuration, the pinion gears 11 and the side gears 13 are configured as straight bevel gears.

In the differential device 10, the differential ring gear 15 is directly connected to the differential case 16. The differential case 16 houses the left and right side gears 13 connected to the left and right drive shafts 12L, 12R and the pinion gears 11, which connect the left and right side gears 13. When there is no difference in rotation between the left and right drive wheels coupled to the left and right drive shafts 12L, 12R, the differential device 10 is rotated together with the differential case 16.

As a result, the left and right drive wheels rotate in the same direction. When a difference in rotation occurs between the left and right drive wheels due to cornering or the like, one side gear 13 is rotated while the differential ring gear 15 is fixed, and the other side gear 13 is rotated in the opposite direction via the pinion gears 11. As a result, the rotation difference generated in the left and right drive wheels during the turning is canceled, and turning can be performed smoothly.

Hereinafter, the structure of the differential device 10 will be described in more detail.

In the differential device 10, the differential ring gear 15 meshed with a drive pinion gear of a gear mechanism not shown is integrated with the differential case 16 (first differential case 17, second differential case 18) by a bolt 19.

Here, the first differential case 17 is formed by a cylindrical support portion 17a and a flange-shaped fixing portion 17b. The first differential case 17 is rotatably supported by a bearing (not shown) installed between an outer peripheral surface of the support portion 17a and a transmission case not shown.

The second differential case 18 is formed of a cylindrical small-diameter support portion 18a and a cylindrical large-diameter support portion 18b. The second differential case 18 is rotatably supported by a bearing installed between an outer peripheral surface of the small-diameter support portion 18a and the transmission case not shown. A pinion shaft 14 that extends through the large-diameter support portion 18b of the second differential case 18 toward the inner side is fixed to the large-diameter support portion 18b, and the pinion gear 11 is rotatably supported by the large-diameter support portion 18b.

The differential ring gear 15 and the differential case 16 (first differential case 17, second differential case 18) are configured to rotate integrally about the axis of the drive shaft 12.

The side gears 13 that can rotate integrally with the drive shaft 12 is meshed with the pinion gears 11. The side gears 13 each have a cylindrical portion 21 and a gear portion 22. In the cylindrical portion 21 of the side gear 13L, an end portion 23 on one axial side (non-gear side in the case of the side gear 13) of the cylindrical portion 21 is positioned inside an opening portion formed in the transmission case not shown. The cylindrical portion 21 is configured to be integrally rotatable with the drive shaft 12L inserted from the one axial side.

A gear portion 24 (side gear portion) is provided on the other axial side (the gear side in the case of the side gear 13L) of the cylindrical portion 21.

Splines St are formed on the side on which a gear portion 26 is formed for example, among a second inner peripheral surface 25 of the cylindrical portion 21. In contrast, splines Ss are formed in a part of a surface of the drive shaft 12L that is inserted into the cylindrical portion 21. When the splines St and the splines Ss mesh with each other, the side gear 13L and the drive shaft 12L rotate integrally.

Similarly, in a cylindrical portion 27 of the side gear 13R, an end portion 28 on the other axial side (non-gear side in the case of the side gear 13R) of the cylindrical portion 27 is positioned inside the opening portion formed in the transmission case not shown. In addition, the cylindrical portion 27 is configured to be integrally rotatable with the drive shaft 12R inserted from the other axial side.

A gear portion 29 (side gear portion) is provided on one axial side of the cylindrical portion 27. The splines St are formed on the side on which the gear portion 29 is formed for example, among an inner peripheral surface 30 of the cylindrical portion 27.

In contrast, the splines Ss are formed in a part of the surface of the drive shaft 12R that is inserted into the cylindrical portion 27. When the splines St and the splines Ss mesh with each other, the side gear 13R and the drive shaft 12R rotate integrally.

Next, the configuration of the pinion shaft 14 serving as the shaft member will be described in detail.

[1] Base Material of Shaft Member

As a base material (material) of the pinion shaft 14 that is a shaft member, high carbon steel in which a carbon content (mass percent:mass %) is 0.6 mass % or more with a high hardness not only on the surface but also on the inside, or more preferably, high carbon steel in which the carbon content is 0.85 to 1.10 mass % is conceivable.

Further, high carbon alloy steel is used in consideration of wear resistance. An example of high carbon alloy steel includes high carbon chromium bearing steel known as bearing steel.

A typical high carbon chromium bearing steel defined by Japanese Industrial Standards (JIS) is high carbon chromium bearing steel with a symbol SUJ2 (in which carbon content is 0.95 to 1.10 mass %) defined by JIS G 4805 standard. However, it is also possible to use other high carbon chromium bearing steels, such as the symbols SUJ3, SUJ4, SUJ5 (in which carbon content is 0.95 to 1.10 mass %).

By using high-carbon steel or high-carbon alloy steel described above, it is possible for the base material to have a sufficient internal hardness against internal stress, and it is possible to make fatigue strength of the pinion shaft 14 have a sufficient value.

[2] About Plating

Next, plating and plating process will be described.

Figure 2:
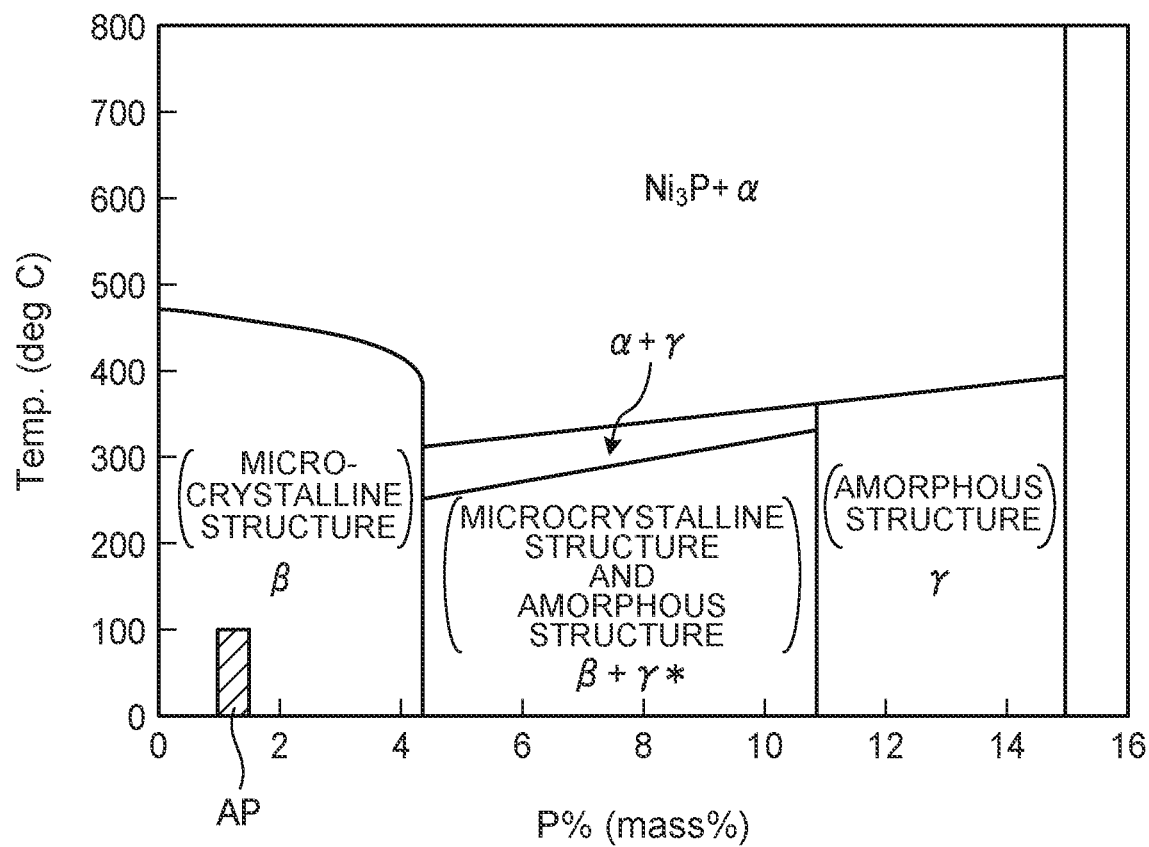
FIG. 2 is a state view of a crystalline state of nickel-phosphorus plating applied to a shaft member of an embodiment.

FIG. 2 is a state view of a crystalline state of nickel-phosphorus plating applied to a shaft member of an embodiment.

As illustrated in FIG. 2, a 13 layer is formed when the mixing ratio of phosphorus is 1 to 4.5% by weight % (wt %) and the temperature is 400° C. to 450° C. or less.

The β layer has a microcrystalline structure in which a uniform layer containing a crystalline solid solution of phosphorus in nickel is formed.

An α layer is in a state in which nickel contains 0.17% or less of a solid solution of phosphorus.

Further, a γ layer is an amorphous uniform layer.

In the present embodiment, since baking is not performed as described above, a so-called low phosphorus-type plating (layer) in which a plating film has a high hardness even in a plating deposition state and which has a phosphorus content of about 4 mass % or less is used.

In this case, although the hardness of the plating layer when the phosphorus content is 1 to 4 mass % does not change, it is preferable to set the phosphorus content to 1 to 1.5 mass % at which the deposition rate is high, from the viewpoint of plating productivity.

Although it is described that baking is not performed, there is no problem even if baking (heating) is performed as long as the β layer can be maintained alone over the entire area of the plating layer.

That is, in the case of FIG. 2, application is possible if the phosphorus content is about 4 mass % or less and the baking temperature is 400° C. or less.

The crystal state is not always as shown in FIG. 2 due to various conditions.

Thus, in order to ensure reliability of the product, it is preferable that the phosphorus content be 1 to 1.5 mass % and the baking temperature be 100° C. or less, as shown by a hatched portion AP in FIG. 2.

The reason for setting the baking temperature to 100° C. or lower is that the formation of $Ni_3P$ can be suppressed, which is preferable.

Figure 3:
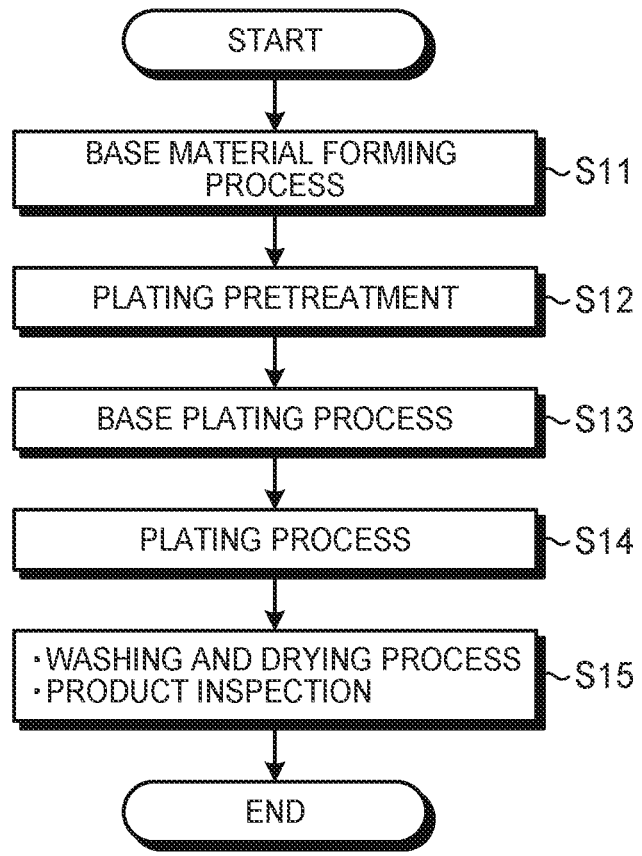
FIG. 3 is a manufacturing flowchart of the shaft member of the embodiment.

Baking at 100° C. or lower may be performed after the washing and drying process in step S15 in the manufacturing flowchart shown in FIG. 3.

Also, as a pretreatment for plating, immersion degreasing or anodic electrolytic degreasing is preferable in order to suppress hydrogen embrittlement of the material.

Further, since adhesion of the low phosphorus-type plating (layer) to the base material (high carbon steel) is poor, the high phosphorus plating (layer) or electrolytic nickel plating (layer) is preferably applied as a binder layer. In this case, also as the binder layer, the thickness of the base plating layer is set to about 1 μm when the thickness of the plating layer is 10 μm. That is, the thickness of the high phosphorus plating (layer) or the electrolytic nickel plating (layer) is set to be smaller than that of the low phosphorus plating layer.

In this way, the low phosphorus plating layer on the surface can maintain the hardness of the plating layer, and the base plating layer can ensure adhesion to the base material and thus, reliability of the shaft member can be improved.

Next, a manufacturing method of the shaft member according to the embodiment will be described.

FIG. 3 is a manufacturing flowchart of the shaft member of the embodiment.

In the following description, a water washing process or the like is performed if necessary after each step, although description is omitted.

First, a forming process (machining process) of high carbon steel serving as the base material of the shaft member (more preferably, bearing steel (for example, SUJ2) that is high-carbon alloy steel) is performed to make the shape of the shaft member into a desired shape (step S11).

Next, a pre-plating process is performed (step S12).

Although a degreasing process is performed as the pre-plating process, there is a possibility of hydrogen entering the steel material when cathodic electrolytic degreasing is performed. Thus, immersion degreasing for a predetermined time (for example, 20 minutes) or anodic electrolytic degreasing for a predetermined time (for example, 1 to 3 minutes) is performed.

By performing the low phosphorus plating that satisfies the necessary hardness even in the plating deposition state, the baking step after plating can be simplified.

Subsequently, a base plating process is performed to improve adhesion of the plating layer (step S13).

As the base plating process, it is preferable that a medium to high phosphorus plating process or an electrolytic nickel plating process be applied.

Subsequently, a plating process for forming a plating layer is performed (step S14).

As the plating process to be performed, the low phosphorus plating process is performed. Specifically, nickel phosphorus plating in which the phosphorus content is 1 to 1.5 mass % is performed, and baking is not performed or is not performed effectively.

As a result, embrittlement of the plating layer due to baking can be eliminated or greatly reduced. Thus, it is possible to suppress cracks, which can cause fatigue failure, from being generated in the plating layer.

Next, the shaft member after plating is washed and dried, then product inspection is performed and the process is finished (step S15).

According to the shaft manufacturing method described above, high carbon steel (more preferably, bearing steel (for example, SUJ2) that is high-carbon alloy steel) serving as the base material of the shaft member is used. Thus, the internal hardness can be improved and fatigue strength can be sufficiently ensured in terms of material.

Further, since baking that stimulates the formation of $Ni_3P$, which causes the plating layer to become brittle, is not effectively performed on the plating layer, embrittlement of the plating layer can be suppressed.

Regarding the decrease in the hardness of the plating layer due to not performing baking effectively, the low phosphorus plating (layer) is used. The medium phosphorus to high phosphorus plating layer or an electrolytic nickel plating layer is formed as the base plating layer (binder layer) to avoid a decrease in adhesion caused by using the low phosphorus plating. Thus, both the hardness and adhesion can be ensured.

As a result, it is possible to form a shaft member with high fatigue strength, wear resistance, and reliability.

In the above description, the case in which the shaft member is used as the pinion shaft of a differential device is described. However, the shaft member is not limited to this, and any shaft member that requires fatigue strength and wear resistance can be similarly applied.

Hereinafter, embodiments substantiating the present invention will be described in detail.

FIG. 4 is an explanatory view of the embodiment and a comparative example.

[1] First Embodiment

In the first embodiment, as illustrated in FIG. 4, bearing steel SUJ2 subjected to furnace quenching (heat treatment) is used as the base material, and nickel phosphorus plating with a phosphorus amount of 1 to 1.5 mass % (low phosphorus plating) is performed as the plating process. Baking is not performed effectively. Electroless degreasing is performed for 20 minutes as a pretreatment. Electrolytic nickel phosphorus plating is formed as the base plating so as to have a thickness of 1 μm, and a process is performed so that the low phosphorus plating (layer) having a film thickness of 10μ is formed.

Thus, the thickness of the electrolytic nickel plating (layer) is set to be smaller than that of the low phosphorus plating layer.

In this way, the low phosphorus plating layer on the surface can maintain the hardness of the plating layer, and the base plating layer can ensure adhesion to the base material, and reliability of the shaft member can be improved.

As a result, according to the first embodiment, the hardness of the plating layer (plating film) is Hv663, and the fatigue hardness exceeding 1456 Mpa that is the target fatigue strength at 30 thousand times is achieved.

[2] Second Embodiment

In a second embodiment, as illustrated in FIG. 4, a bearing steel SUJ2 subjected to furnace quenching (heat treatment) is used as the base material, and nickel phosphorus plating with a phosphorus amount of 1 to 1.5 mass % (low phosphorus plating) is performed as the plating process. Baking is not performed effectively. Anodic electrolytic degreasing is performed for 20 minutes as the pretreatment. High phosphorus plating (layer) is formed as the base plating so as to have a thickness of 1 μm, and a process is performed so that the low phosphorus plating (layer) having a film thickness of 10μ is formed.

Thus, the thickness of the high phosphorus plating (layer) is set to be smaller than that of the low phosphorus plating layer.

In this way, the low phosphorus plating layer on the surface can maintain the hardness of the plating layer, the base plating layer can ensure adhesion to the base material, and reliability of the shaft member can be improved.

As a result, in the second embodiment, the hardness of the plating layer (plating film) is Hv663 and the fatigue hardness exceeding 1456 Mpa that is the target fatigue strength at 30 thousand times is achieved.

[3] Comparative Example

In the comparative example, as illustrated in FIG. 4, chromium molybdenum steel SCM420H subjected to carburizing and nitriding (heat treatment) is used as the base material, nickel phosphorus plating with a phosphorus amount of 8 to 10 mass % is performed as the plating process. Baking is performed at 330° C. for 1 hour. Electroless degreasing is performed for 20 minutes as the pretreatment, and a process is performed so that the low phosphorus plating (layer) having a film thickness of 10μ is formed without the base plating.

As a result, according to the first embodiment, the hardness of the plating layer (plating film) is Hv772 and the fatigue strength is 905 Mpa, which does not reach the target fatigue strength 1456 Mpa at 30 thousand times.

[4] Conclusion

As described above, according to the first embodiment and the second embodiment, it is possible to obtain the shaft member in which the hardness of the plating layer is sufficient and in which the performance exceeds the target fatigue strength at 30 thousand times.

In contrast, in the comparative example, although the hardness of the plating layer is sufficient, the target fatigue strength at 30 thousand times is not exceeded and the desired performance is not obtained.

While the embodiments of the present invention have been described, these embodiments are presented by way of example, and there is no intention to limit the scope of the invention. These new embodiments can be implemented in other various forms, and various omissions, replacements, and changes can be made without departing from the spirit and scope of the invention. These embodiments and the modifications thereof are included in the scope and the main point of the invention, and are also included in the invention described in the claims and the scope of equivalents thereof.

The shaft member of the present embodiment has at least the following configuration.

The shaft member (14) of the present embodiment includes: the base material having a shaft shape and made of steel; the low phosphorus plating layer that is laminated on the base material; and the base plating layer that is formed as the electrolytic nickel phosphorus plating layer or the high phosphorus plating layer laminated between the base material and the low phosphorus plating layer.

According to this configuration, the strength of the shaft member can be increased and the size of the shaft member can be decreased.

Further, the base material may be high carbon steel or high carbon alloy steel.

According to this structure, the internal hardness of the shaft member can be increased, the shaft member can be made stronger with respect to bending stress, and fatigue strength can be improved.

Further, the carbon content of high carbon steel or high carbon alloy steel may be set to 0.85 to 1.10% by mass %.

According to this configuration, the internal hardness of the shaft member can be sufficiently increased and fatigue strength can be improved.

The thickness of the base plating layer may be set to be smaller than the thickness of the low phosphorus plating layer.

According to this configuration, the low phosphorus plating layer on the surface can maintain the hardness of the plating layer, the base plating layer can ensure plating adhesion to the base material, and reliability of the shaft member can be improved.

The phosphorus content of the low phosphorus plating layer may be set to 4.5 mass % or less.

According to this configuration, the crystalline state of the low phosphorus plating layer can be a uniform layer of a crystalline solid solution having a minute crystalline structure in nickel, and a stable plating layer can be formed.

The phosphorus content in the low phosphorus plating layer may be set to 1.0 to 1.5 mass %.

According to this configuration, the crystalline state of the low phosphorus plating layer can be a uniform layer of the crystalline solid solution, and the $Ni_3P$ content may be suppressed to form a more stable plating layer having a high strength.

Further, the surface of the shaft member may be the low phosphorus plating layer.

According to this configuration, it is possible to stably maintain the hardness of the surface while ensuring plating adhesion to the base material.

The manufacturing method of the shaft member of the present embodiment includes at least the following configuration.

The manufacturing method of the shaft member according to the present embodiment includes: the degreasing step (step S12) of performing electroless degreasing or anodic electrolytic degreasing for a predetermined time on the base material made of steel that configures the shaft member; and the plating step (step S14) of performing the low phosphorus-type plating in which the phosphorus content is 4.5 mass % or less.

According to this configuration, it is possible to easily manufacture the shaft member in which the internal hardness is sufficiently high and fatigue strength is improved.

Further, in the low phosphorus plating step, plating in which the phosphorus content is 1.0 to 1.5 mass % may be applied as low phosphorus type plating.

According to this configuration, the crystalline state of the low phosphorus plating layer can be a uniform layer of a crystalline solid solution and the $Ni_3P$ content can be suppressed to form a more stable plating layer having high strength.

Between the degreasing step (step S12) and the plating step (step S14), a base plating step (step S13) for performing the electrolytic nickel phosphorus plating process or the high phosphorus plating process may be provided.

According to this configuration, it is possible to manufacture the shaft member in which adhesion between the base material and the low phosphorous plating layer is improved and fatigue strength is further improved.

DESCRIPTION OF THE REFERENCE NUMERALS

14 . . . Pinion shaft (shaft member), S12 . . . Plating pretreatment step, S13 . . . Base plating process step, S14 . . . Plating process step.

The invention claimed is:

1. A shaft member comprising:
a base material having a shaft shape and made of steel;
a base plating layer laminated on the base material; and
a low phosphorus plating layer that is laminated on the base plating layer material, and includes phosphorus, and in which a phosphorus content is 4.5 mass % or less, wherein
the base plating layer is formed as an electrolytic nickel phosphorus plating layer or a high phosphorus plating layer laminated between the base material and the low phosphorus plating layer, and
a thickness of the base plating layer is set to be smaller than a thickness of the low phosphorus plating layer.

2. The shaft member according to claim 1, wherein the base material is high carbon steel or high carbon alloy steel.

3. The shaft member according claim 2, wherein a carbon content of the high carbon steel or high carbon alloy steel is set to be 0.85 to 1.10 mass %.

4. The shaft member according to claim 1, wherein a surface of the shaft member is the low phosphorus plating layer.

5. A shaft member comprising:
a base material having a shaft shape and made of steel;
a base plating layer laminated on the base material;
a low phosphorus plating layer that is laminated on the base plating layer material, and includes phosphorus, and in which a phosphorus content is 1.0 to 1.5 mass % or less, wherein
the base plating layer is formed as an electrolytic nickel phosphorus plating layer or a high phosphorus plating layer laminated between the base material and the low phosphorus plating layer.

6. The shaft member according to claim 5, wherein the base material is high carbon steel or high carbon alloy steel.

7. The shaft member according claim 6, wherein a carbon content of the high carbon steel or high carbon alloy steel is set to be 0.85 to 1.10 mass %.

8. The shaft member according to claim 5, wherein a surface of the shaft member is the low phosphorus plating layer.

* * * * *